W. F. CLASS.

Assignor to WORSWICK MANUFACTURING COMPANY.

Apparatus for Pumping Fluids from Casks, &c.

No. 8,026. Reissued Jan. 8, 1878.

Witnesses:

F. O. McCleary

A. W. Bright

Inventor:

Wm F. Class.

Per Leggett & Leggett Attorneys.

UNITED STATES PATENT OFFICE.

WILLIAM F. CLASS, OF CLEVELAND, OHIO, ASSIGNOR TO WORSWICK MANUFACTURING COMPANY, OF SAME PLACE.

IMPROVEMENT IN APPARATUS FOR PUMPING FLUIDS FROM CASKS, &c.

Specification forming part of Letters Patent No. 191,656, dated June 5, 1877; Reissue No. 8,026, dated January 8, 1877; application filed December 1, 1877.

DIVISION B.

*To all whom it may concern:*

Be it known that I, WILLIAM F. CLASS, of Cleveland, in the county of Cuyahoga and State of Ohio, have invented a certain new and useful Improvement in Apparatus for Pumping Fluids from Casks, &c.; and I do hereby declare the following to be a full, clear, and exact description of the invention, such as will enable others skilled in the art to which it pertains to make and use it, reference being had to the accompanying drawings, which form a part of this specification.

The nature of my invention consists in the construction of a plug or tap in apparatus for pumping fluids from casks or other vessels, as will be hereinafter set forth.

Figure 1:
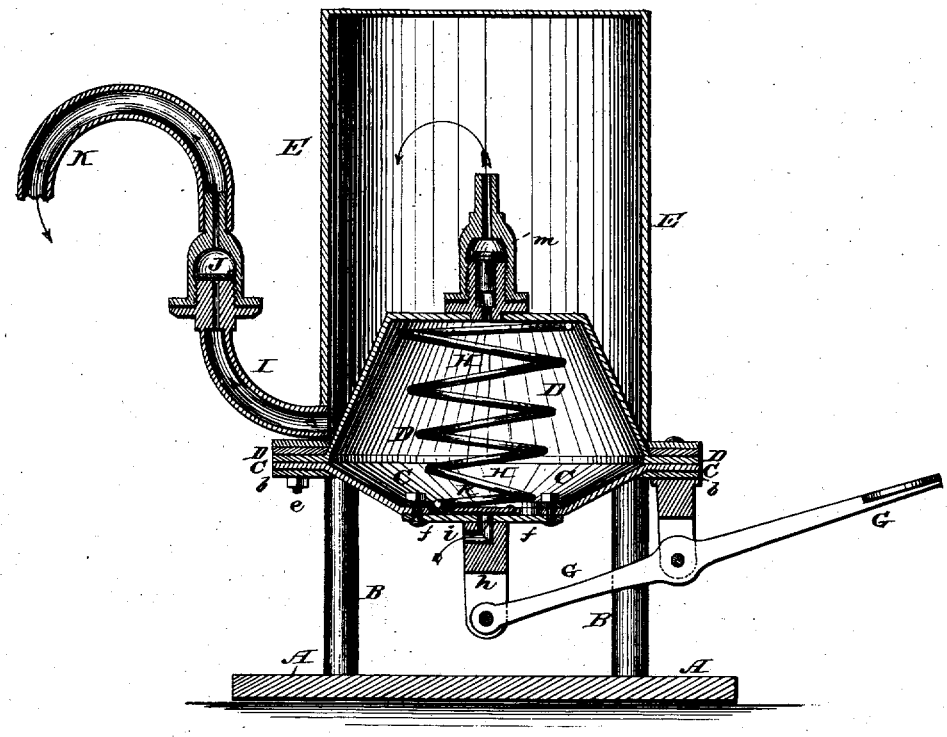
Figure 2:
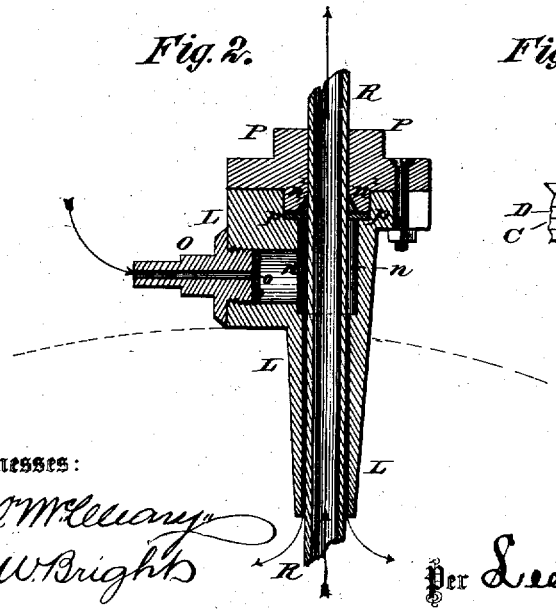
Figure 3:
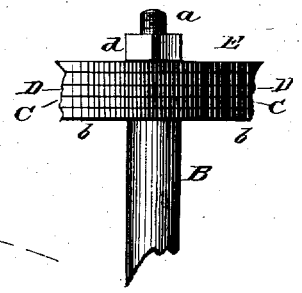

In the drawings, Figure 1 is a vertical transverse section of an apparatus such as may be used in connection with the plug or tap. Fig. 2 is a similar view of the plug or tap, and Fig. 3 is a detail view of a part of the apparatus shown in Fig. 1.

A represents the bed or base plate, upon which the air-pump is supported on suitable posts B B. The upper ends of these posts are formed with screws *a*, on which is first placed a flat ring or flange, *b*, then a leather or rubber disk, C, and on that an inverted dish or truncated cone, D, having a projecting flange around its lower edge to pass over the bolts *a*. On the top of this flange is then placed a cylindrical air-chamber, E, having also a flange around its lower edge, and the whole then fastened by nuts *d*, screwed upon the ends of the screws *a*. These parts are further firmly united by any suitable number of bolts, *e*, passing through them.

In the center of the flexible disk C is secured a metallic plate, *f*, provided with a post, *h*, projecting downward from the center thereof. This post is hollow at its upper end, with a check-valve, *k*, on the top, and a passage, *i*, leading out at the side.

The lower end of the post *h* is bifurcated, and in the same is attached the inner end of a treadle, G, which is pivoted in a post attached to the under side of the flange *b*. The flexible disk is distended downward to its full extent by means of an interior spring, H, interposed between it and the truncated cone D. In the top of this cone is a check-valve, *m*, to admit air into the air-chamber E and to prevent the air from returning.

From one side of the air-chamber E, extends a bent outlet-tube, I, to a check-valve, J, and to this check-valve is connected a rubber or other flexible tube, K, for conducting the air to the vent-plug that is to be inserted in the cask or barrel, or other vessel from which the fluid is to be pumped. This vent-plug is constructed of a slightly-tapering barrel, L, having near its upper end a suitable aperture for the insertion of a nipple, O, to which the end of the flexible tube K is attached.

The upper end of the barrel L has an interior enlarged chamber, *n*, and a suitable flange around its outer side. To this flange is bolted a cap, P, which has a central opening corresponding with the main bore of the barrel. Between the barrel and cap is fastened a rubber ring or thimble, *p*, with a small central opening. This opening should be smaller than the outside circumference of a pipe, R, which is passed through the cap and barrel, and, of course, through the rubber ring or thimble *p*, which latter forms a cut-off to prevent the escape of the air through the opening in the cap.

The cap P has also an interior chamber, *n'*, corresponding somewhat with the chamber *n* within the barrel L. These chambers are, as seen, one above and one below the rubber ring or thimble *p*, and are of great importance, as they allow room for the movement of the rubber ring or thimble *p* in inserting and drawing out the pipe R, and thus facilitating such movement.

The plug thus constructed is driven into the vessel to be emptied, after which the tube R is forced down through the plug to any desired depth in the cask or vessel to be drawn from. The air is now forced, by means of the air-pump, into the barrel L and around a pipe, B, into the vessel, forcing the liquid up through said pipe R. The air-chamber E of the pump may be dispensed with and the flexible pipe K attached directly to the check-valve *m* in the top of the cone D.

The operation of the plug is as follows: When it is placed in the cask or barrel the pipe R is made to pass down into the fluid, if needs be, to the bottom, or at least so that its end shall be immersed in the contained fluid. Air is now injected into the induction-pipe O. This air passes down around the body of the pipe R into the cavity of the cask above its contained liquid. The inwardly-opening valve *o*, with which the induction-pipe O is provided, prevents any escape of the air thus inducted, and the elastic thimble *p* acts as a packing around the pipe R, and prevents any escape of air in this direction. The pressure exerted by the induction of air, as just described, will thus obviously be exerted upon the body of the contained fluid within the cask, which pressure will force said fluid through the pipe R, upon the end of which is placed any suitable faucet.

I do not lay any claim in this division (B) of reissue to the pumping device shown and described, as the same forms the subject-matter of Division A of reissue of the original patent.

Having fully described my invention, what I claim as new, and desire to secure by Letters Patent, is—

1. In a plug, the combination, with the conical or cylindrical barrel and the eduction-pipe, of the elastic ring and the annular chambers, formed, respectively, above and below the inner edge of said ring, substantially as set forth.

2. In a plug, the combination, with the barrel, of the induction-pipe provided with the inwardly-opening valve, governing communication between the same, substantially as set forth.

3. A plug consisting in the combination, with the barrel and the induction-pipe provided with an air-valve, of the eduction-pipe, the elastic ring, the upper and lower ring, expanding chambers, and the cap-piece, substantially as set forth.

In testimony whereof I have hereunto set my hand this 21st day of November, 1877, in the presence of two subscribing witnesses.

WILLIAM F. CLASS.

Witnesses:
F. TOUMEY,
JNO. CROWELL, Jr.